(12) United States Patent
Liu

(10) Patent No.: US 8,082,046 B2
(45) Date of Patent: Dec. 20, 2011

(54) INJECTION MOLDING SYSTEM AND METHOD FOR SETTING VALVE ACTION

(75) Inventor: Hsing-Chang Liu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 645 days.

(21) Appl. No.: 12/206,742

(22) Filed: Sep. 9, 2008

(65) Prior Publication Data

US 2009/0289386 A1 Nov. 26, 2009

(30) Foreign Application Priority Data

May 26, 2008 (CN) .......................... 2008 1 0301781

(51) Int. Cl.
G05B 11/01 (2006.01)
B29C 39/00 (2006.01)
G06F 19/00 (2011.01)
G06F 3/00 (2006.01)
G06F 3/048 (2006.01)
G06G 7/66 (2006.01)

(52) U.S. Cl. ............ 700/17; 700/83; 700/197; 700/200; 700/204; 700/205; 715/700; 715/764; 715/809

(58) Field of Classification Search .......... 700/196–197, 700/200, 204, 17, 83; 425/135, 559, 562, 425/564; 715/700, 764, 809
See application file for complete search history.

(56) References Cited

U.S. PATENT DOCUMENTS

| | | | | | |
|---|---|---|---|---|---|
| 5,470,218 | A | * | 11/1995 | Hillman et al. | 425/144 |
| 5,766,526 | A | * | 6/1998 | Watanabe | 264/40.5 |
| 5,818,450 | A | * | 10/1998 | Katsuta | 715/840 |
| 5,896,290 | A | * | 4/1999 | Katsuta et al. | 700/83 |
| 6,140,716 | A | * | 10/2000 | Norton | 307/125 |
| 6,338,004 | B1 | * | 1/2002 | Usui | 700/200 |
| 6,618,041 | B2 | * | 9/2003 | Nishizawa | 345/173 |
| 6,684,264 | B1 | * | 1/2004 | Choi | 710/15 |
| 6,848,895 | B2 | * | 2/2005 | Konishi et al. | 425/130 |
| 6,931,300 | B2 | * | 8/2005 | Yamazaki et al. | 700/200 |
| 7,031,800 | B2 | * | 4/2006 | Bulgrin | 700/200 |
| 7,218,990 | B2 | * | 5/2007 | Katsuta et al. | 700/202 |
| 7,346,425 | B2 | * | 3/2008 | Nishizawa et al. | 700/200 |
| 7,421,309 | B2 | * | 9/2008 | Nishizawa et al. | 700/200 |
| 7,447,561 | B2 | * | 11/2008 | Araki et al. | 700/200 |
| 7,521,008 | B2 | * | 4/2009 | Nagaoka et al. | 264/40.1 |
| 7,632,438 | B2 | * | 12/2009 | Baumann | 264/40.1 |
| 7,890,880 | B2 | * | 2/2011 | Hehl | 715/771 |
| 2004/0047935 | A1 | * | 3/2004 | Moss et al. | 425/145 |
| 2004/0262799 | A1 | * | 12/2004 | Wang | 264/40.1 |
| 2005/0082706 | A1 | * | 4/2005 | Nagaoka et al. | 264/40.1 |
| 2006/0235567 | A1 | * | 10/2006 | Araki et al. | 700/200 |
| 2006/0247822 | A1 | * | 11/2006 | Nishizawa et al. | 700/200 |
| 2007/0156279 | A1 | * | 7/2007 | Dalley | 700/197 |
| 2007/0273060 | A1 | * | 11/2007 | Doyle et al. | 264/40.7 |
| 2009/0028986 | A1 | * | 1/2009 | Vasapoli et al. | 425/563 |
| 2010/0138031 | A1 | * | 6/2010 | Werfeli et al. | 700/200 |
| 2010/0161108 | A1 | * | 6/2010 | Yeager et al. | 700/200 |

* cited by examiner

*Primary Examiner* — Ronald Hartman, Jr.
(74) *Attorney, Agent, or Firm* — Altis Law Group, Inc.

(57) ABSTRACT

A method for setting valve action, used by a control system having a dialog box, includes choosing a start/stop mode of the valve action. A dialog box of the control system shows start/stop condition fields according to the start/stop mode of the valve action. A start/stop condition field for start/stop timing of the valve action is set.

13 Claims, 6 Drawing Sheets

| | Current cycle | | | | | | | | | Next cycle | | | | | | | | |
|---|---|---|---|---|---|---|---|---|---|---|---|---|---|---|---|---|---|---|
| Position setting | mm | | | | | | mm | | mm | | | | | | | mm | | |
| Action process | Close mold position | Nozzle forward | Injection | Vel/ pressure switch | Decompression | Recovery | Withdraw | Open mold position | Eject forward | Eject backward | Close mold position | Nozzle forward | Injection | Vel/ pressure switch | Decompression | Recovery | Withdraw | Open mold position | Eject forward | Eject backward |
| Process start | | | | | | | | 200.0 | | | | | | | | | | | | |
| Action time | Setup 3 seconds | | | | | | | | | | | | | | | | | | |
| Delay time | Setup 0.1 seconds | | | | | | | | | | | | | | | | | | |

— 10

| | Current cycle | | | | | | | | Next cycle | | | | | | |
|---|---|---|---|---|---|---|---|---|---|---|---|---|---|---|---|
| Position setting | mm | | | | | mm | | | mm | | | | | mm | |
| Action process | Close mold position | Nozzle forward | Injection | Vel/pressure switch | Decompression | Recovery | Withdraw | Open mold position | Eject forward | Eject backward | Close mold position | Nozzle forward | Injection | Vel/pressure switch | Decompression | Recovery | Withdraw | Open mold position | Eject forward | Eject backward |
| Process start | | | | | | | | 200.0 | | | | | | | | |
| Action time | Setup 3 seconds | | | | | | | | | | | | | | | |
| Delay time | Setup 0.1 seconds | | | | | | | | | | | | | | | |

FIG. 1

| | Current cycle | | | | | | | | Next cycle | | | | | | | |
|---|---|---|---|---|---|---|---|---|---|---|---|---|---|---|---|---|
| Position setting | mm | | | | | mm | | | mm | | | | | mm | | |
| Action process | Close mold position | Nozzle forward | Injection | Vel/pressure switch | Decompression | Recovery | Withdraw | Open mold position | Eject forward | Eject backward | Close mold position | Nozzle forward | Injection | Vel/pressure switch | Decompression | Recovery | Withdraw | Open mold position | Eject forward | Eject backward |
| Process start | External signal touch off | | | | | | | | | | | | | | | | |
| Action time | Setup 2.5 seconds | | | | | | | | | | | | | | | | |
| Delay time | Setup 0.2 seconds | | | | | | | | | | | | | | | | |

| Position setting | | | | | mm | | | mm | | | | | | mm | | | mm | | |
|---|---|---|---|---|---|---|---|---|---|---|---|---|---|---|---|---|---|---|---|
| Action process | Close mold position | Nozzle forward | Injection | Vel/ pressure switch | Decompression | Recovery | Withdraw | Open mold position | Eject forward | Eject backward | Close mold position | Nozzle forward | Injection | Vel/ pressure switch | Decompression | Recovery | Withdraw | Open mold position | Eject forward | Eject backward |
| Process start | | | | △ External signal touch off | | | | | | | | | | | | | | | | |
| Process over | | | | | | | | | ▨ | | | | | | | | | | | |
| Delay time | Setup 0 seconds | | | | | | | | | | | | | | | | | | | |

／ 10

Current cycle — Next cycle

FIG. 5

|  | Male blow | Female blow |  |
|---|---|---|---|
| Position | yyy.y | yyy.y | mm |
| Blow time | xx.xx | xx.xx | sec |
| Blow delay | xx.xx | xx.xx | sec |

FIG. 6
(RELATED ART)

INJECTION MOLDING SYSTEM AND METHOD FOR SETTING VALVE ACTION

BACKGROUND

1. Field of the Invention

The invention generally relates to injection molding and, particularly, to a method for setting valve action of an injection molding machine.

2. Description of Related Art

Referring to FIG. 6, a valve control system of an injection molding machine includes a human-machine interface. The interface includes a valve action dialog box receiving data input, configured for setting timing of the valve action accordingly. The valve action dialog box offers only preset values, and cannot satisfy the needs of different manufacturing processes. Since start/stop timing of the valve actions require different setting modes, the valve action dialog box must be modified, thus increasing the workload of a programmer.

What is needed, therefore, is a method for setting valve action addressing the described limitations.

BRIEF DESCRIPTION OF THE DRAWINGS

FIG. 1 is a diagram of a first dialog box of a control system utilizing a method for setting valve action in accordance with an embodiment of the present invention.

FIG. 4 is a diagram of a third dialog box of a control system utilizing a method for setting valve action in accordance with an embodiment of the present invention.

FIG. 5 is a diagram of a fourth dialog box of a control system utilizing a method for setting valve action in accordance with an embodiment of the present invention.

FIG. 6 is a diagram of a conventional dialog box for setting valve action.

DETAILED DESCRIPTION OF THE EMBODIMENTS

A method for setting valve action of an injection molding machine in accordance with an exemplary embodiment is provided. Referring to FIG. 1, the injection molding machine includes a control system having a human-machine interface. The interface includes a dialog box having a plurality of input fields, via which a user can input data and select options.

Figure 2:
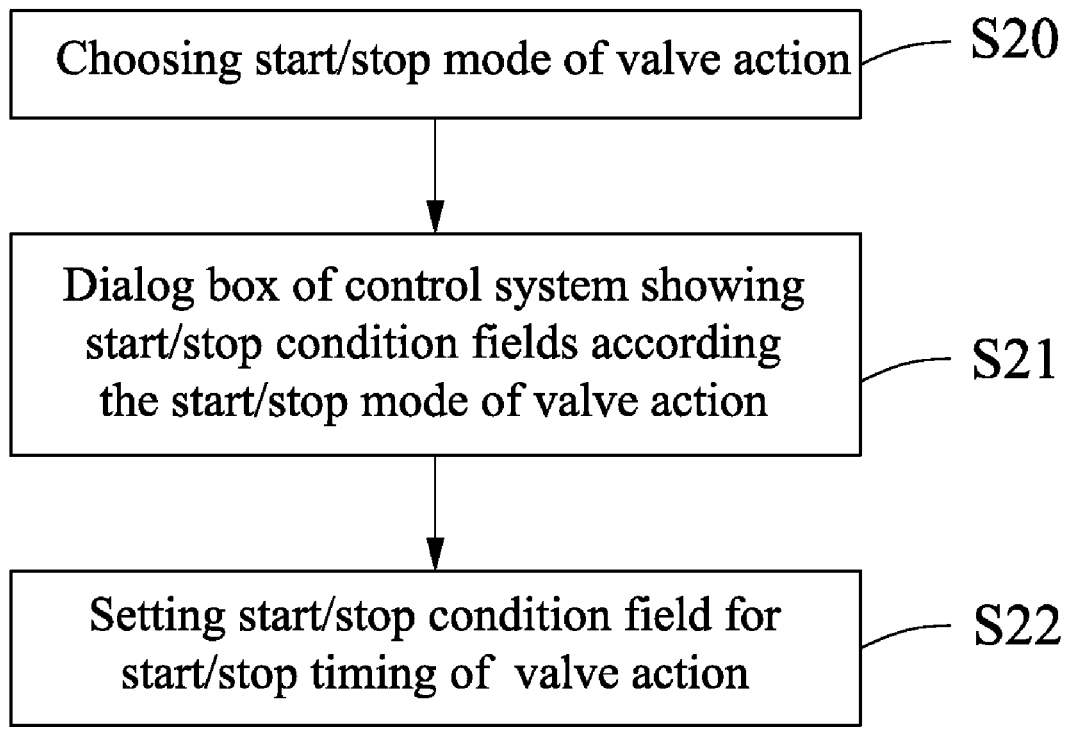
FIG. 2 is a flowchart of a method for setting valve action in accordance with an embodiment of the present invention.

Referring to FIG. 2, the method includes the following steps.

In Step S20, a start/stop mode of the valve action is chosen, based on a start condition and stop condition of the valve action, respectively. The start conditions of the valve action include action process and external signal. The stop conditions of the valve action of includes action process and action time. An appropriate start/stop mode is chosen according to the requisite manufacturing process.

In Step S21, a dialog box of a control system utilizing a method for setting valve action shows condition fields according to the start/stop mode of the valve action. The start/stop condition fields include action process, position setting, action time, and delay time fields. The start/stop condition fields include two injection molding cycles. Action processes include mold close position, nozzle forward, injection velocity/pressure switch, decompression, recovery, withdraw, mold open position, eject forward, and eject backward fields.

In Step S22, a start/stop condition field for start/stop timing of the valve action is set. The action process of the start condition field precedes the action process of the stop condition field.

Referring back to FIG. 1, a dialog box 10 of a control system utilizing a method for setting valve action shows the first start/stop mode of the valve action. The start condition of the first start/stop mode is an action process. The stop condition of the first start/stop mode is when an action time expires. The valve action and injection molding action start at the same time. For example, an operator may choose the "open mold position" in the action process field of the start condition field, input data 200.0 into the "mold open position", input data 0.1 in the delay time field, and input data 3 into the action time field of the stop condition field. Consequently, the mold is opened to the set "open mold position", the valve action starts after 0.1 seconds, and after 3 seconds, the valve action stops.

Figure 3:
FIG. 3 is a diagram of a second dialog box of a control system utilizing a method for setting valve action in accordance with an embodiment of the present invention.

Referring to FIG. 3, the dialog box 10 of the control system utilizing a method for setting valve action shows the second start/stop mode of the valve action. The start condition of the second start/stop mode is an action process. The stop condition of the second start/stop mode is an action process. For example, an operator may choose the "withdraw" in the action process field of the start condition field in the current cycle, the valve action stops when injection molding is complete, choose the "nozzle forward" in the action process field of the stop condition field in the next cycle. The action process of the start condition field precedes the action process of the stop condition field. When the current injection molding process cycle reaches "withdraw", valve action starts. When the next injection molding process cycle goes "nozzle forward", the valve action stops.

It should be noted that the start and stop valve action timing of the second start/stop mode can be in the same or different cycles. The cycle of stopping the valve action timing cannot precede the start of valve action timing.

Referring to FIG. 4, dialog box 10 of the control system utilizing a method for setting valve action shows the third start/stop mode of the valve action. The start condition of the third start/stop mode is generated by an external signal, timing for which is shown on the dialog box according to the action process. The stop condition of the third start/stop mode is an action time. For example, an operator may input data 0.2 into the delay time field, input data 2.5 into the action time field of the stop condition field. When the control system receives the external signal, the valve action starts after 0.2 seconds. After 2.5 seconds action time of the valve action, the valve action stops.

Referring to FIG. 5, dialog box 10 of the control system utilizing a method for setting valve action shows the fourth start/stop mode of the valve action. The start condition of the third start/stop mode is activation of an external signal. The stop condition of the fourth start/stop mode is an action process. For example, an operator may set the external signal, the external signal timing shows on the dialog box according the action process, choose the "eject forward" in the action process field of the stop condition field. When the control system receives the external signal, start the valve action. When the injection molding process goes to the "eject forward", the valve action stops.

It is to be understood that the above-described embodiment are intended to illustrate rather than limit the invention. Variations may be made to the embodiment without departing from the spirit of the invention as claimed. The above-described embodiments illustrate the scope of the invention but do not restrict the scope of the invention.

What is claimed is:

1. A method for setting a valve action having a plurality sets of start condition type and stop condition type, utilized by a control system comprising a human-machine interface, the method comprising:
   selecting an operation mode of the valve action corresponding to one of the sets of start condition type and stop condition type;
   displaying condition fields according to the selected operation mode of the valve action on the human-machine interface of the control system; and
   setting the condition fields to configure a start condition and a stop condition of the valve action corresponding to the set of start condition type and stop condition type of the selected operation mode.

2. The method as claimed in claim 1, wherein the start condition of the valve action is determined by an action process or an external signal, and the stop condition of the valve action is determined by an action process or an action time.

3. The method as claimed in claim 2, wherein the start condition is an action process, the valve action and an injection molding action start at the same time, the stop condition is an action process, and the valve action stops when the injection molding action is complete.

4. The method as claimed in claim 1, wherein the condition fields include an action process field, a position setting field, an action time field, and a delay time field.

5. The method as claimed in claim 4, wherein the action time field corresponds to the duration of the valve action, and the delay time field corresponds to a delay time before starting the valve action.

6. The method as claimed in claim 4, wherein the action process field includes a mold closed position field, a nozzle forward field, an injection velocity or pressure switch field, a decompression field, a recovery field, a withdraw field, an mold open position field, an eject forward field, and an eject backward field.

7. The method as claimed in claim 1, wherein the timing of the start condition precedes the timing of the stop condition.

8. The method as claimed in claim 1, wherein the timing of the start condition and the stop condition of the operation mode are selectively located in different cycles, and the cycle of the timing of the stop condition does not precede the cycle of the timing of the start condition.

9. An injection molding system, comprising:
   an injection molding machine including at least a valve, wherein the valve has a plurality sets of start condition type and stop condition type; and
   a valve control system controlling the valve of the injection molding machine, wherein the valve control system includes a human-machine interface displaying condition fields, the condition fields are capable of being set so that a start condition of the valve corresponds to one of the condition fields and a stop condition of the valve corresponds to another of the condition fields;
   wherein the valve selectively operates in an operation mode corresponding to one of the sets of start condition type and stop condition type, such that the start condition and the stop condition of the valve correspond to the set of start condition type and stop condition type of the selected operation mode, the human-machine interface displays the operation mode to be selected and displays the condition fields according to the selected operation mode of the valve.

10. The system as claimed in claim 9, wherein the start condition of the valve is determined by an action process or an external signal, and the stop condition of the valve is determined by an action process or an action time.

11. The system as claimed in claim 9, wherein the condition fields include an action process field, a position setting field, an action time field, and a delay time field.

12. The system as claimed in claim 11, wherein the action process field includes a mold closed position field, a nozzle forward field, an injection velocity or pressure switch field, a decompression field, a recovery field, a withdraw field, an mold open position field, an eject forward field, and an eject backward field.

13. The system as claimed in claim 9, wherein the timing of the start condition and the stop condition of the operation mode are selectively located in different cycles, and the cycle of the timing of the stop condition does not precede the cycle of the timing of the start condition.

* * * * *